United States Patent [19]

Pollard

[11] 4,199,390
[45] Apr. 22, 1980

[54] EMBOSSING AND LAMINATING PROCESS

[76] Inventor: Stephen L. Pollard, 405 Holly Ave., Monrovia, Calif. 91016

[21] Appl. No.: 615,125

[22] Filed: Sep. 19, 1975

Related U.S. Application Data

[63] Continuation of Ser. No. 444,723, Feb. 22, 1974, abandoned.

[51] Int. Cl.² .............................................. C09J 5/04
[52] U.S. Cl. .................................. 156/209; 156/219; 156/315; 428/59
[58] Field of Search ............... 156/219, 220, 209, 314, 156/315, 77, 310; 428/320, 158–160

[56] References Cited
U.S. PATENT DOCUMENTS

| | | | |
|---|---|---|---|
| 2,650,212 | 8/1953 | Windemuth | 156/77 X |
| 2,946,713 | 7/1960 | Dusina et al. | 156/219 X |
| 3,256,131 | 6/1966 | Koch et al. | 156/209 |
| 3,446,685 | 5/1969 | Goldstone et al. | 156/219 |
| 3,817,818 | 6/1974 | Riding et al. | 428/320 X |

Primary Examiner—David A. Simmons
Attorney, Agent, or Firm—Wills, Green & Mueth

[57] ABSTRACT

A method of making a composite product having a preformed, self-sustaining pliable skin sheet and a preformed non-rigid void containing, low density plastic layer which comprises:
(1) establishing a layer of said low density plastic,
(2) applying to at least one side a liquid sprayable curative,
(3) next applying to the same said side thereof a liquid sprayable polymer which together with said curative is reactive at elevated temperature to form a tenacious, essentially non-porous adhesive which bonds to both said sheet and said layer,
(4) next contacting said skin sheet with said side of the low density plastic layer,
(5) curing said polymer at elevated temperature whereby said skin sheet is adhered to said layer.

8 Claims, 2 Drawing Figures

EMBOSSING AND LAMINATING PROCESS

This is a continuation of application Ser. No. 444,723, filed Feb. 22, 1974, now abandoned.

BACKGROUND OF THE INVENTION

Synthetic plastic foam such as flexible, low-density polyurethane is widely used as an upholstery material in automobiles and furniture. The foam is covered with an attractive and wear-resistant outer layer of vinyl, "Naugahyde", etc.

The present invention relates to an improvement in such materials and the method for their fabrication.

SUMMARY OF THE INVENTION

Briefly, the present invention comprises a method of making a composite product having a preformed, self-sustaining pliable skin sheet and a preformed non-rigid void containing, low density plastic layer which comprises:

(1) establishing a layer of said low density plastic,
(2) applying to at least one side a liquid sprayable curative,
(3) next applying to the same side thereof a liquid sprayable polymer which together with said curative is reactive at elevated temperature to form a tenacious essentially non-porous adhesive which bonds to both said sheet and said layer,
(4) next contacting said skin sheet with said side of the low density plastic layer,
(5) curing said polymer at elevated temperature whereby said skin sheet is adhered to said layer.

The invention also includes the novel die and press comprising the upper and lower platens, the upper platen carrying a laminating die having embossing projections and trimming knife; the improvement wherein the leading edges of projections are provided with a resilient, yielding material which gives slightly as it approaches the lower platen, allowing the cutting edge of knife to score or slit the work piece while applying embossing pressure to predetermined areas of said work piece.

It is an object of my invention to provide a novel method of making a composite article.

More particularly, it is an object of my invention to provide a novel method of making a composite article having a porous foam layer and an essentially porous or non-porous skin sheet.

A further object of my invention is the method of making a composite article in a safer manner.

Still another object of my invention is the provision of a novel composite article.

These and other objects and advantages of this invention will be apparent from the detailed description which follows when taken in conjunction with the accompanying drawings.

DESCRIPTION OF THE PREFERRED EMBODIMENTS

Figure 1:
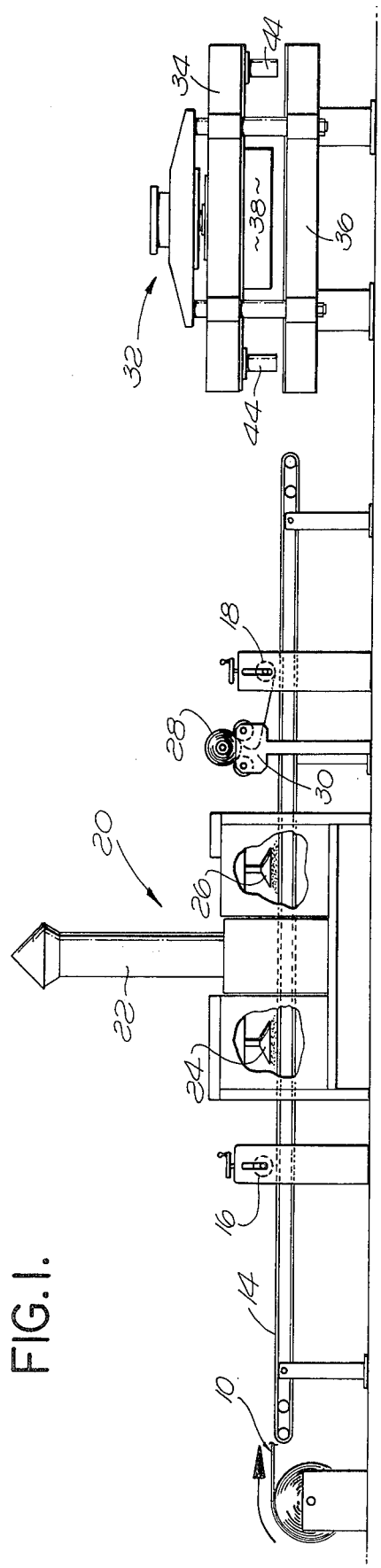
Figure 2:
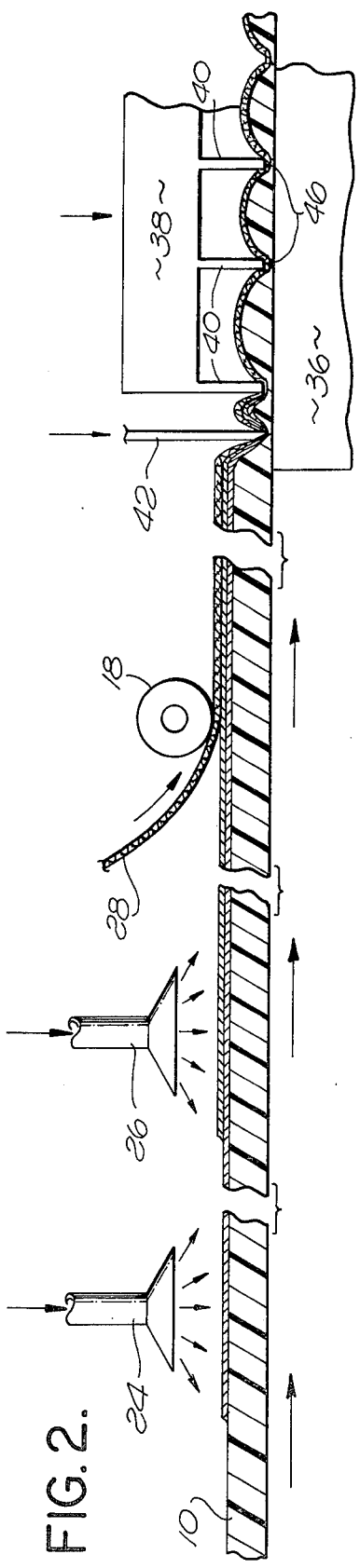

In the drawings:
FIG. 1 is a side semi-schematic view of the method of this invention.
FIG. 2 is a partial side sectional view of certain portions of FIG. 1.

Considering the drawings in greater detail, the preformed polymeric, flexible foam 10 is carried in roll form on dispenser 12. The foam is rolled out on conveyor 14. The pinch rollers 16 and 18 keep the foam layer under lengthwise tension between the rollers. The spray booth 20 provides a vapor-containing closure which prevents the escapage of noxious fumes and odors into adjacent work stations. Booth 20 has a vertical flue or stack 22 for continuous or periodic removal of fumes formed or evolved within booth 20. The stack 22 may be provided with means for recovering or trapping the fumes to prevent their discharge into the atmosphere and allow for partial recycle. The booth 22 contains spray heads 24 and 26. These heads discharge different materials onto the foam layer in a sequential manner for the purposes and with the results hereinafter discussed. The non-porous sheet, normally plastic or cloth 28, or cloth supported-or backed-vinyl, is carried by dispenser 30.

In operation, the layer of foam 10 moves from left to right in the arrangement shown in the drawings. The foam 10 is held under longitudinal tension by rollers 16 and 18 as a first solution or liquid is sprayed onto the foam from head 24. This first solution contains a curative. The second solution is sprayed atop the first solution. The second solution includes a polymer reactive with the curative in the first solution. For example, the first solution may be an aqueous solution of an organic amine and the second solution a polyester urethane containing functional groups such as hydroxyl which are of complementary reactivity with the amine. The solutions are both applied at room temperature or slightly above, viz, 70° F.–100° F., first and second solutions are each applied at a rate to provide about 5–20 mils thickness on the foam. The solutions are sprayed on since I have found that roller application causes premature reaction of the curative or polymer. One significant advantage of this invention is that the solutions can be sprayed onto the foam, the vinyl or other skin sheet applied, and then held at about 60° F.–100° F. for many hours without any significant curing occurring. The spraying in booth 20 prevents the contamination of areas around work stations by toxic and/or noxious fumes which are, in many cases, no longer permissible under applicable statutes. The pinch roller 18 presses the skin sheet 28 against the foam 10, wetting the back side of sheet 28 with the wet solutions. However, the pressure applied must be less than would push or force the solutions deeply into or through the foam 10 since I have observed that excessive pressure at this point will result in cured polymer being eventually formed within the pores of the foam, yielding a hardened or stiffened foam layer which lacks some of the flexibility and resilient desired in high quality upholstery. It is critical to this invention that the solution bearing the curative be sprayed on first followed by the polymer. I have found that otherwise, the first solution will wet the surface of the skin sheet, resulting in little or poor bonding. While not bound by any theory, it is believed that the pressure of the curative under the polymer causes the curative to be forced or to migrate through the polymer during curing, and that this results in superior laminating and embossing.

The curing and bonding operation is carried out in hydraulic press 32. The press has upper and lower platens 34 and 36. The upper platen 34 carries laminating die 38 having embossing projections 40 and trimming knife 42. The stop block 44 acts to limit the downward movement of upper platen 34 so that die 38 is held slightly above and away from the lower platen 36 when the upper platen 34 is in its lower-most position, as shown at the right side of FIG. 2. The platens 34 and 36 are heated to a temperature which activates the cure of the curative and polymer. Preferably, the first solution containing the curative contains water or some other valatile solvent which is evolved under the heat of the lower platen 36 so that the gases are more or less trapped within the laminate, generating a pressure which assures good bonding of the foam to the skin sheet. In other words, the laminating occurs, not by mechanical pressure, but under the vapor pressure of the evolved gases from the first and second solutions at the temperatures generated by the lower platen 36. The embossing at projection 40 occurs, of course, under the mechanically applied pressure of the projections 40 approaching but not quite touching the face of lower platen 36.

The conveyor 14 has a stop-start operation so that a length of the uncured but assembly composite is advanced into the press 32. The conveyor 14 then stops while the press cures the polymer. This requires from about 30 seconds to several minutes. The knife 42 scores or partially severs the laminate formed within the press 32 so that when the press opens, the laminate can be torn off and used, while the conveyor advances the next length of the composite into the press 32 for curing and so on.

The invention also includes the novel die and press comprising the upper and lower platens 34 and 36, the upper platen 34 carrying a laminating die 38 having embossing projections 40 and trimming knife 42; the improvement wherein the leading edges of projections 40 are provided with a resilient, yielding material 46 which gives slightly as it approaches the lower platen, allowing the cutting edge of knife 42 to score or slit the work piece while applying embossing pressure to said work piece. The material 46 allows the knife edge to approach gradually so that the knife edge does not bang against the lower platen, resulting in its destruction or at least, shortened life. Thus, the non-yielding part of the embossing projections is slightly shorter in length than the knife edge, while the non-yield part plus the yielding edge of the embossing projections is slightly longer (when there is no compression force being applied) in length than the knife edge.

The present invention is applicable to low density plastic foams and skin sheet materials which have been previously used in the manufacture of upholstery and the like. Since these materials, per se, are already familiar to those skilled in the art, they need not be discussed in extenso in this patent.

Many variations in this invention will occur to those skilled in the art. Accordingly, this invention is limited only by the scope of the appended claims.

I claim:

1. A method of making a composite product having a preformed, self-sustaining pliable non-void containing skin sheet and a preformed non-rigid void containing, low density plastic layer which comprises:
    (1) establishing a layer of said low density plastic,
    (2) spraying on at least one side of liquid sprayable curative to yield a wetted surface on said low density plastic,
    (3) next spraying on said wet surface of the low density plastic a liquid sprayable polymer to wet the surface of the low density plastic with said polymer, said polymer being one which together with said curative is reactive at elevated temperature to form a tenacious, essentially non-porous adhesive which bonds to both said sheet and said layer,
    (4) next contacting said skin sheet with said wetted surface of said low density plastic layer, and
    (5) curing said polymer at elevated temperature whereby said skin sheet is adhered to said layer.

2. The product of the method of claim 1.

3. The method of claim 1 wherein the low-density plastic is polyurethane foam.

4. The method of claim 1 wherein said polymer and said curative are essentially non-reactive at about room temperature.

5. The method of claim 1 wherein said curing is carried out such that embossing occurs in selective areas under the influence of externally applied mechanical pressure and laminating occurs in the remaining areas under a lesser pressure which is the self-generated pressure of the trapped gases and vapors generated by heating said polymer and said curative to their interreactive temperature.

6. The method of claim 1 wherein said polymer is a polyurethane having functional groups of complementary reactivity with functional groups on said curative.

7. The method of claim 1 wherein the spraying steps are carried out in a closure which contains any fumes or vapors and said fumes or vapors are removed from said closure in a controlled and channeled manner.

8. The method of claim 1 wherein said curative is an aqueous solution and said laminating occurs under the vapor pressure of water at the curing temperature.

* * * * *